Figure 1:
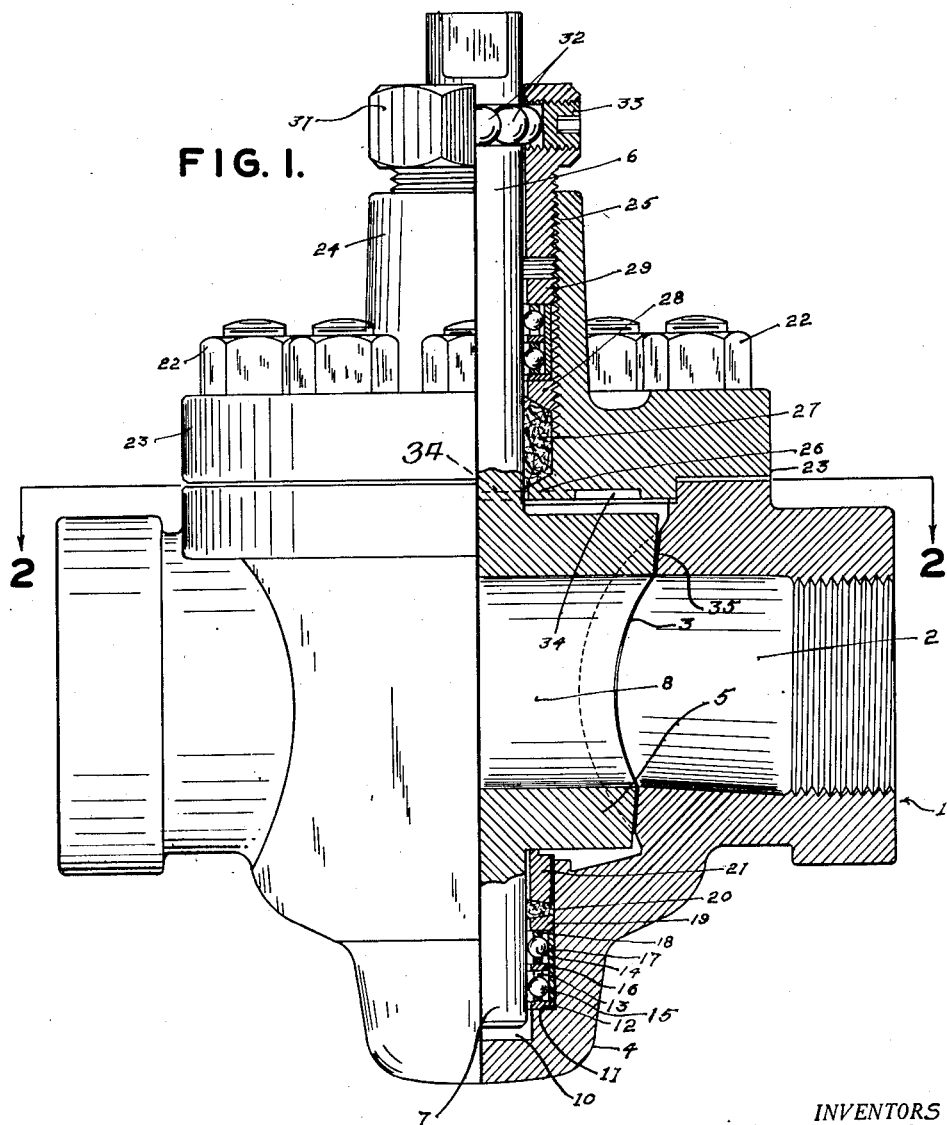

Dec. 3, 1935.   B. B. WHITTLE ET AL   2,023,349
VALVE
Filed Jan. 11, 1934   2 Sheets-Sheet 1

FIG. I.

INVENTORS
Benjamin B. Whittle
BY Leland J. Lawne
Loyal J. Miller.
ATTORNEYS.

UNITED STATES PATENT OFFICE 2,023,349

VALVE

Benjamin B. Whittle and Leland J. Towne, Oklahoma City, Okla.; Lessie F. Whittle executrix of will of said Benjamin B. Whittle, deceased Application January 11, 1934, Serial No. 706,218

5 Claims. (Cl. 251—103)

Our invention relates to valves and more particularly to valves of the stop-cock type designed particularly for use on high pressure flow lines.

By a valve of the stop-cock type is meant a device for regulating the flow of fluids through a pipe, consisting of a tapered substantially conical plug having a hole or port therethrough, and working rotatably in a rigid shell bored out to receive the plug, the shell having passages for connecting pipes at each end. Rotation of the plug controls the passage of fluids by bringing the openings in the plug opposite these in the shell, or away from them.

When used in controlling the flow of fluids under high pressures, stop-cock valves of usual design are prone, when open, to become wedged or frozen in the bore of the shell, and consequently when effort is made to close them it is found impossible to do so.

The prime object of my invention is to provide a valve of the type described, the core or plug of which may be mechanically forced when in either an open or closed position to wedge in the housing or shell, and afterwards, when it is desired to rotate the core, it may be quickly and easily moved to eliminate its wedged contact.

The present invention is an improvement over co-pending applications of similar title of Benjamin B. Whittle, said applications having been filed respectively upon June 26, 1933, August 12, 1933, and December 16, 1933, and respectively bear Serial Nos. 677,595; 684,803, and 702,754.

Other objects of the invention are to provide a valve of the type described which is new, novel, practical and of utility; a valve so designed that the only movable part thereof which contacts either stem of the core consists of bearing balls; the movable parts of which, other than the core will be packed off from any fluid in the flow hole thereof; a valve so designed that an end thrust on the core, usually occasioned by the pressure of the flowing fluids, will not effect the relation of the core with the shell or housing; a valve which is particularly adaptable for use in the control of extremely high pressures and which may be easily and quickly operated even though working in such pressure without any lubrication whatsoever; which will require no gearing arrangement for its operation; which will embody a means for selectively moving the core longitudinally within the housing; which will be strong and durable, and comparatively cheap to manufacture; and, which will be efficient in accomplishing all the purposes for which it is intended.

In handling high pressures in flow lines it has been in the past found necessary in order to use valves of the stop-cock type to provide them with various gear mechanisms for the purpose of rotating the core against the enormous frictional load. Heretofore it has been impractical to build stop-cock valves for operation upon flow line pressures of as great as five thousand pounds per square inch. For purpose of illustration, a stop-cock valve with a three inch shaft designed for operation upon a ten inch flow line carrying a pressure of six thousand pounds per square inch, will develop 42,411 pounds of end thrust upon the core. The same valve under the same condition will receive 778,000 pounds side thrust upon the core. When these pressures are considered it may be readily understood why usual stop-cock valves have not been found practical under high pressures. The friction between the core and its housing is so great that it is almost impossible to rotate the core.

Another difficulty encountered in valves of the stop-cock type is occasioned by the fact that they are extremely hard to lubricate properly, a portion or all of the lubricant being washed out by the flowing fluid in the flow hole, each time the valve is operated.

Our device is so designed that no lubricant whatsoever is required in order to overcome friction.

Our valve is also designed to prevent the danger of any extraneous solid substances in the flowing fluid lodging between the core and the housing, and thus rendering the valve inoperable.

Figure 2:
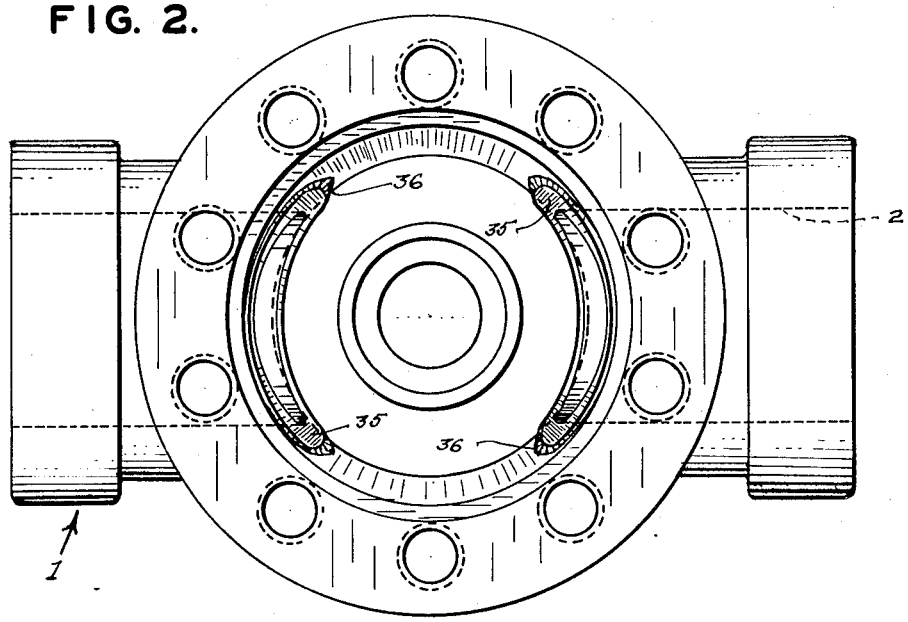

With these and other objects in view as will more fully appear, our invention consists in the construction, novel features, and combination of parts hereinafter more fully described, pointed out in the claims hereto appended, and illustrated in the accompanying two-sheet drawing, of which, Figure 1 is a side elevational view, partially in section; and, Fig. 2 is a top view of the housing with its cap and core removed, taken on the line 2—2 of Fig. 1.

Like characters of reference designate like parts in all the figures.

It is understood that various changes in the form, proportion, size, shape, weight and other details of construction, within the scope of our invention may be resorted to without departing from the spirit or broad principle of our invention and without sacrificing any of the advantages thereof; and it is also understood that the drawings are to be interpreted as being illustrative and not restrictive.

A description of one practical embodiment of the invention follows:

The reference numeral 1 indicates as a whole a valve case or housing having a longitudinal flow-hole 2 therethrough, and which is adapted at each end to be connected in a pipe or flow line, not shown. The housing 1 intermediate its ends is provided with a transverse tapered bore 3 which extends through the upper wall and past the flow-hole 2 into the lower wall. The lower wall at this point is bulged outwardly to form a boss 4 and is made considerably thicker than at other points.

The bore 3 is adapted to receive a tapered valve core 5 which is mounted at its axis rigidly upon or made integral with upper and a lower axially alined shafts 6 and 7. The upper shaft 6 is the longer of the two and both are preferably formed by turning down the material from which the core 5 is formed. Thus the shafts are actually reduced continuations of the core.

The bore 3 is adapted to receive a tapered valve core 5 which is mounted at its axis rigidly upon or made integral with two axially alined shafts 6 and 7. The core 5 has a transverse through-perforation 8 adapted to form a continuation of the flow-hole 2 when the core is in a proper radial position and the core is sufficiently large to completely obstruct the flow-hole 2 when turned ninety degrees from the position illustrated in the drawings.

The inner face of the boss 4 is centrally provided with a superficial bore 10 for receiving the lower shaft 7, and its upper portion is enlarged to form a shoulder 11. The lower portion of the bore 10 is slightly greater in diameter than the diameter of the shaft 7. Upon the shoulder 11 is a hardened annular ring 12 upon which rests an annular ball race 13. The race 13 is of a width less than the diameter of balls retained by it, one of the balls being indicated by the reference numeral 14. An annular hardened sleeve 15 rests upon its edge upon the ring 12 and acts as a means for holding the balls 14 in desired relation to the shaft 7, and the balls in turn hold the shaft 7 from contact with the walls of the lower portion of the bore 10.

Another ring 16, similar to the ring 12, is seated upon the race 13 and upon the upper edge of the sleeve 15, and another sleeve 17 and ball race 18 are positioned upon the ring 16. Any desired plurality of the rings, ball races, and sleeves may be provided in the bore 10, but it will be noted that only the balls contact the shaft 7.

Upon the upper-most race and sleeve is seated the lower member or ring 19 of a packing gland, and upon the ring 19 is seated packing 20. Upon the packing 20 is an upper packing ring 21 the upper edge of which contacts the lower end of the core 5 and is held in place thereby when the core is at the lower end of its throw. When the core is raised, pressure of fluid in the flow hole will press upon the upper edge of the ring 21 and hold it in place.

It will be noted that the rings 19 and 21 do not contact the shaft 7 and that their adjacent edges are slightly bevelled, and that the packing 20 is also slightly bevelled so that downward pressure upon the ring 21 acts to hold both rings away from the shaft and to force the packing into positive contact therewith.

Around the stem 6, closing the upper end of the bore 3, and held removably yet firmly upon the housing by bolts and nuts 22 is a cap 23 having an upstanding protrusion 24. The cap is centrally provided with a threaded bore 25 the lower portion of which is reduced in diameter to form a sloping shoulder 26. The larger portion of the bore 25 is somewhat greater in diameter than the diameter of the shaft 6, and its reduced portion is only slightly larger than the shaft 6. Seated upon the shoulder 26 is packing 27 held in place by a threaded packing ring 28 having its lower edge bevelled to force the packing into positive contact with the shaft.

Seated upon the ring 28 is a ring structure, sleeve structure and bearing structure, similar to those described as surrounding the shaft 7, and these structures are held firmly in place by a threaded compression ring 29.

It will be noted in the drawings with reference to the structures thus far described that none of the elements are attached to either of the shafts, and that the only elements in frictional contact with either shaft are the bearing balls and the packing.

Threadedly engaged in the upper portion of the bore 25 is an adjusting nut 31 which surrounds the shaft 6 and the bore of which is sufficiently large to preclude its contact with the shaft 6. The shaft 6 and the inner wall of the nut 31 are provided with complemental annular grooves which house rotatably a plurality of bearing balls 32. The balls 32 receive all of the end pressure which may be exerted upon the core 5 in either direction. The nut 31 is transversely bored to permit the insertion of the balls 32, and this transverse bore is then closed by a suitable plug 33.

In operation, at any time the core is not in its seated position all side thrust upon the core is received by the bearing balls in the bores 10 and 25, and at all times, all end thrust is received by the balls 32. When the core is seated the seat in the housing then receives all the side thrust upon the core. When it is desired to raise or lower the core in the housing, rotation of the nut 31 accomplishes its longitudinal movement through the co-action of the balls 32 and the complemental grooves in which they are housed.

At the upper end of the bore 3 of the housing, the lower surface of the cap 23 is provided with an arcuate groove 34 which extends for approximately a ninety degree arc. The upper surface of the core is provided with an upstanding lug, not shown, which extends into the groove 34 and acts as a stop to insure the proper radial positioning of the core when either in its closed or open position.

Referring now more particularly to Fig. 2 of the drawing, the means will be described whereby the danger of extraneous substances in the flowing fluid imparing proper action of the core is eliminated. Surrounding each of the points at which the flow hole 2 intercepts or meets the bore 3, the wall of the bore is provided with a substantially annular boss 35 which is formed arcuately and machined to conform to the periphery of the core 5, and the inner faces of each of which are adapted to form a fluid tight seal therewith when the core is at the lower end of its throw. The surrounding edges of the bosses 35 are bevelled as indicated by the reference numeral 36 to insure against their in any manner obstructing the rotation of the core 5 by contact with the walls of the through-perforation 8 therein. The bevelled edges 36 also make it easier to insert the core 5 in the bore 3. The bosses 35 provide a space therearound into which any extraneous matter in the flowing fluid may escape when the core is rotated.

Obviously, the invention is susceptible of embodiment in forms other than that which is illustrated in the accompanying drawings and described herein, and applicable, for uses and purposes other than as detailed, and we therefore consider as our own all such modifications and adaptations and other uses of the form of the device herein described as fairly fall within the scope of our invention.

Having thus described our invention, what is claimed and desired to be secured by Letters Patent, is:

1. In a valve of the type described, the combination with a housing having a flow hole and having a transverse bore intercepting said flow hole, a core rotatably mounted in the bore and also having a flow hole, said core having an axial stem at each end, of means for selectively moving the core longitudinally in the housing, said means including a member surrounding one of the stems and adapted to be moved longitudinally thereof by threaded engagement with the housing, a plurality of balls confined in a circular groove formed partially in the stem and partially in the member, the rotation of the member acting to move the core longitudinally by action of the balls, means surrounding each stem for receiving any side thrust which may be exerted upon the core, said means including balls rollably carried by the housing and contacting the stems, means for packing off all of the balls from communication with the flow holes, the balls and the packing means being the only elements in the valve housing which contact either of the stems, and seats for the core surrounding the flow hole of the housing at the points at which it intercepts the bore, said seats protruding into the bore past the walls of the bore.

2. A valve including a valve case or housing having a flow hole therethrough and a transverse tapering bore, the walls of which bore form a valve-seat, a core fitted to and capable of being turned on said seat and having a shaft at one end, a cap secured to the housing and having an upstanding sleeve through which the shaft extends, the sleeve having a screw-threaded bore, an adjusting nut surrounding the shaft and externally screw-threaded to turn in the internal threads of the sleeve, the cap being provided with an inwardly extending shoulder, a packing surrounding the shaft and resting upon the shoulder, anti-friction means located within the sleeve and surrounding the shaft, and packing rings on opposite sides of the anti-friction means and screwed to the threaded bore of the sleeve, one of said rings being in position to engage and exert pressure upon the packing, the shaft and the inner wall of the nut being provided with complementary annular grooves, and a plurality of ball-bearings rotatably housed in said grooves whereby to form a bearing and a means for moving the shaft and core endwise with the turning of the nut in the sleeve.

3. A valve comprising a valve casing having a flow hole therethrough and a transverse bore forming a valve seat, a valve core in said transverse bore and having a valve stem, said casing having a sleeve thereon into which the stem extends, said sleeve having a screw-threaded bore with a shoulder in said bore, packing means on the shoulder, spaced packing rings screw-threaded into the bore and one of which bears against the packing means, and anti-friction means between the packing rings.

4. A valve including a valve case or housing having a flow hole therethrough and a transverse tapering bore, the walls of which bore form a valve-seat, a core fitted to and capable of being turned on said seat and having a shaft at one end, a cap secured to the housing and having an upstanding sleeve through which the shaft extends, the sleeve having a screw-threaded bore, an adjusting nut surrounding the shaft and externally screw-threaded to turn in the internal threads of the sleeve, the cap being provided with an inwardly extending shoulder, a packing surrounding the shaft and resting upon the shoulder, anti-friction means located within the sleeve and surrounding the shaft, and packing rings on opposite sides of the anti-friction means and screwed to the threaded bore of the sleeve, one of said rings being in position to engage and exert pressure upon the packing.

5. A valve comprising a housing having a flow hole and having a transverse bore intercepting said flow hole, a core rotatably mounted in the bore, said core having an axial stem at each end, means surrounding each stem for receiving any side thrust which may be exerted on the core, said means including balls rotatably carried by the housing and contacting the stems, means for packing off all of said balls from communication with the flow hole, the balls and packing means being the only elements in the housing which contact either of the stems.

BENJAMIN B. WHITTLE.
LELAND J. TOWNE.